July 29, 1952 C. H. WHITE ET AL 2,604,745
DISK HARROW FRAME
Filed Aug. 28, 1948 2 SHEETS—SHEET 2
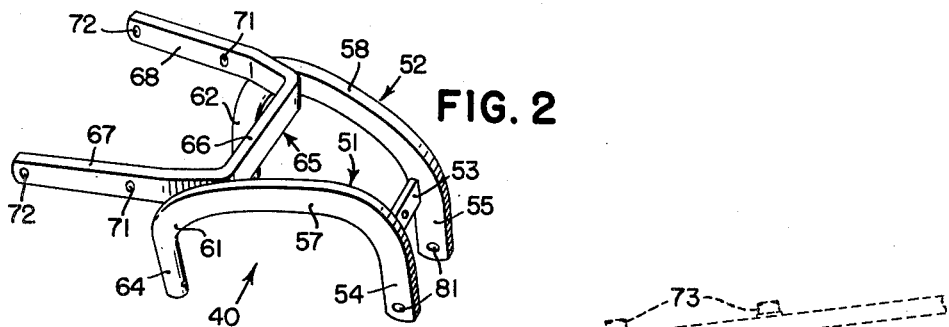
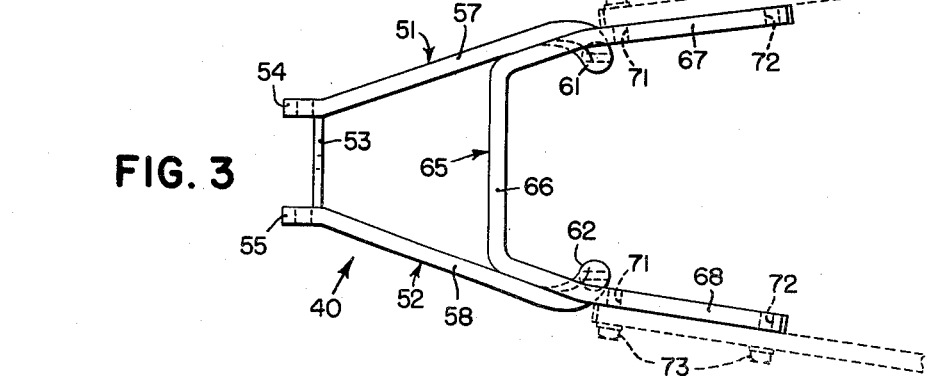
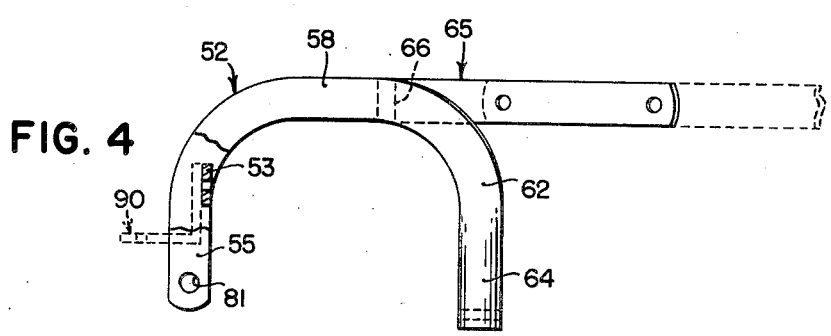
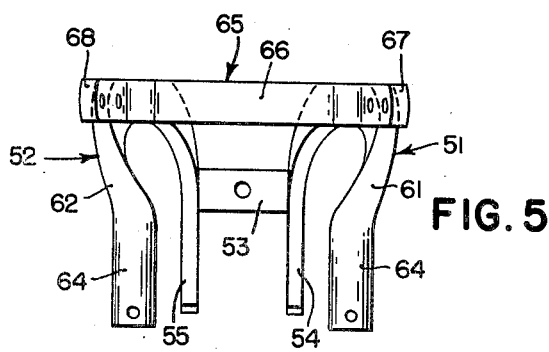
INVENTORS.
CHARLES H. WHITE
WILLIAM P. OEHLER
BY
ATTORNEYS Patented July 29, 1952

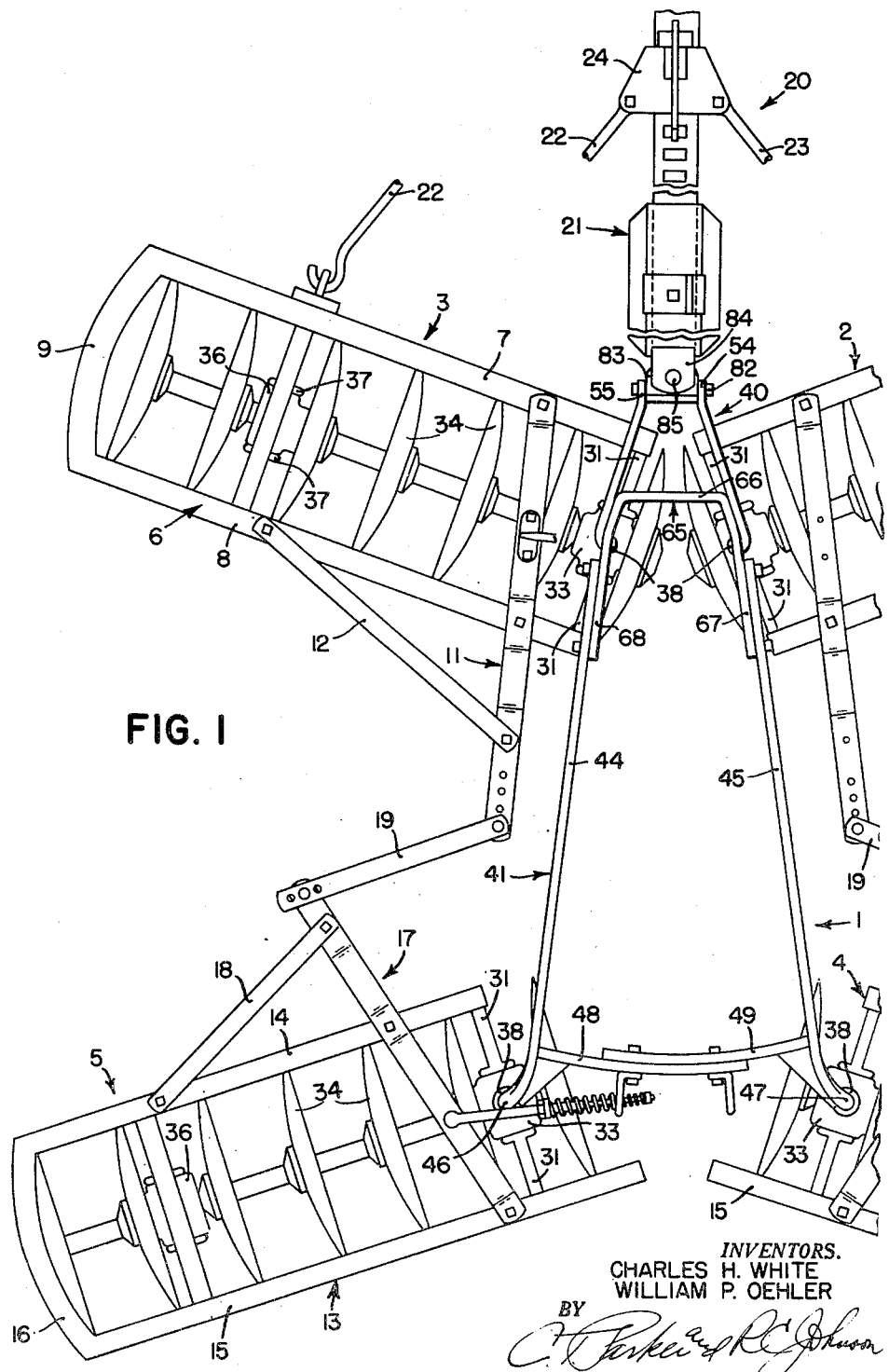
FIG. I
INVENTORS.
CHARLES H. WHITE
WILLIAM P. OEHLER
BY
ATTORNEYS

2,604,745

UNITED STATES PATENT OFFICE 2,604,745

DISK HARROW FRAME

Charles H. White and William P. Oehler, Moline, Ill., assignors to Deere & Company, Moline, Ill., a corporation of Illinois Application August 28, 1948, Serial No. 46,582

4 Claims. (Cl. 55—83)

The present invention relates generally to agricultural implements and more particularly to disk harrows of the type shown in U. S. Patent 2,339,124, issued January 11, 1944 to Charles H. White.

The object and general nature of the present invention is the provision of a new and improved frame construction for disk harrows of the type referred to. More particularly, it is a feature of this invention to provide an improved connection between the front and rear sections of the harrow frame, the harrow frame being separable into two sections, so as to accommodate the use of the front frame section, together with associated gangs and hitch structure, for use as a single action harrow. More specifically, it is a feature of this invention to provide overlapping portions on the two frame sections, said overlapping portions extending generally in a fore and aft direction and provided with fore and aft spaced transversely disposed connecting members, such as bolts, whereby when the frame is connected together for use with both front and rear gangs, the frame sections are rigidly connected so that there is no tendency for looseness to develop.

These and other objects and advantages of the present invention will be apparent to those skilled in the art after a consideration of the following detailed description, taken in conjunction with the accompanying drawings, in which:

Figure 1 is a partial plan view of a tandem disk harrow in which the principles of the present invention have been incorporated.

Figure 2 is a fragmentary perspective of the front portion of the disk harrow frame.

Figures 3, 4 and 5 are detail views of the front frame section.

Referring first to Figure 1, the disk harrow in which the principles of the present invention have been incorporated is of the type shown and claimed in the above mentioned patent and includes a main frame 1 to the forward portion of which a pair of right and left disk gangs 2 and 3 are swingably connected. A pair of rear right and left hand gangs 4 and 5 are swingably connected with the rear portion of the frame 1. Each of the front gangs includes a gang frame 6 having front and rear angle bars 7 and 8 connected together at their outer ends by an end section 9 and at their inner ends by an angling arm and brace member 11. The rear portion of the latter is reenforced by a brace 12 extending from the rear end of the arm 11 outwardly and forwardly to the outer end portion of the rear angle 8. Similarly, each of the rear disk gangs 4 and 5 includes a frame 13 which is made up of a front angle 14, a rear angle 15, an outer end section 16 and a combined brace and angling arm 17 which is reenforced by a brace 18 bolted at its forward end to the forward portion of the member 17 and at its rear end to the outer portion of the associated forward frame angle 14. The left hand front and rear gangs 3 and 5 are interconnected by a link 19 which is pivotally connected at its forward or laterally inner end to the rear end of the arm 11 and at its outer or rear end to the forward end of the arm 17. A link 19 also connects the angling arms of the front and rear right hand gangs 2 and 4. A hitch 20, of conventional construction so far as the present invention is concerned, is connected with the front end of the frame 1 and the front gangs 2 and 3 and incorporates a main draft structure 21 and rearwardly and laterally outwardly extending angling links 22 and 23. The forward ends of the links 22 and 23 are connected to a controllable slide 24 movably mounted on the front portion of the main draft member 21.

The inner end of each of the front gangs 2 and 3 is provided with a pair of bearing brackets 31 which are bolted respectively to the front and rear frame angles 7 and 8 and at their inner and lower ends to a bearing structure 33 which receives the inner end of the gang bolts on which the disks 34 are mounted. The other end portion of the gang bolt is rotatably mounted in an outer bearing 36 fixed to the gang frame 6 by bearing brackets 37. Each of the inner bearings 33 is provided with an upwardly extending socket 38 which receives the associated downwardly extending portion of the main frame, to which more detailed reference will be made below. The rear gangs 4 and 5 are of substantially identical construction, so far as the bearings, disks and bearing brackets are concerned, and hence the same reference numerals have been used for corresponding parts.

Referring now to the main frame 1 of the harrow, with which the present invention is more particularly concerned, it will be noted that the frame 1 comprises a front frame section 40 and a rear frame section 41 detachably connected together but serving when connected as a rigid unitary frame. The reason for providing a frame in two sections is to permit the rear section 41, together with the associated rear gangs and other parts, to be disconnected from the front section, whereupon the front portion of the harrow may then be used as a single action disk harrow merely by providing a bracket to act between the front frame section and the main draft member 21 of the hitch structure to prevent the parts from pivoting one with respect to the other. Normally, when the harrow is arranged as a double action harrow the hitch structure pivots in a generally vertical direction and also in a generally horizontal direction relative to the main frame 1. The rear frame section 41 includes generally fore and aft extending frame bars 44 and 45 having downturned portions 46 and 47 adapted to enter the vertically extending sockets 38 of the rear bearings 33. Overlapping cross bars 48 and 49 are adjustably secured together, as by bolts or the like, and provide for bringing the rear ends of the frame bars 44 and 45 closer together or spacing them farther apart so as to adjust the lateral position of the rear gangs with respect to one another.

The front frame section 40, best shown in Figures 2–5, comprises a pair of right and left hand U-shaped arched members 51 and 52, being right hand and left hand, respectively, and interconnected at their forward portions by an apertured cross bar 53 which is secured at its ends, as by welding, to the upper portions of the downwardly extending front ends 54 and 55 of the U-shaped members 51 and 52. The upper or intermediate portions 57 and 58 of the front frame members 51 and 52 extend generally rearwardly in diverging relation and terminate in downwardly extending sections 61 and 62 which, as best shown in Figure 3, are curved so as to be offset laterally inwardly with respect to the vertical planes of the intermediate sections 57 and 58. The lowermost portions of the downwardly extending parts are rounded so as to cooperate with the front bearings 33, as shown at 64.

The rear portions of the members 51 and 52 are rigidly interconnected by a generally horizontal U-shaped frame part, indicated in its entirety by the reference numeral 65. The member 65 includes a forward central section 66 and two divergingly arranged rearwardly directed leg portions 67 and 68, the forward portions of which are secured, as by welding, to the rear portions of the intermediate sections 57 and 58 and the associated upwardly curved portions of the downwardly extending bearing-receiving lugs 61 and 62. The right and left hand rearwardly directed legs 67 and 68 are provided with a pair of fore and aft spaced threaded openings 71 and 72 which are adapted to receive stud bolts 73 which are passed through openings 74 formed in the front ends of the bars 44 and 45 of the rear frame section 41. By virtue of a considerable amount of space in a fore and aft direction between the two sets of front and rear fastening members 73, and by virtue of the associated overlapping of the bars of the front and rear frame sections, the pulling strain on the harrow places the fastening bolts 73 in shear and provides a very rigid interconnection between the front and rear frame parts and, since the bolts 73 are in shear, there is little tendency for the bolts to stretch and loosen.

It will be seen, particularly from Figures 3 and 5, that underneath the horizontal U-shaped member 65 the upper portions of the rear legs 61 and 62 are curved outwardly above the bearing-receiving portions 64 each of which is disposed in a generally vertical position. The purpose of this curved construction is to allow for up and down movement at the outer end of each of the front gangs without danger of the innermost disk coming into contact with the associated downwardly extending leg 61, 62, of the front frame section 40.

The forward downwardly extending sections 54 and 55 of the arched members 51 and 52 are apertured, as at 81, to receive a pin 82 or the like which connects a pivot block 83 to the frame 1 for movement about a transverse axis. The main draft member 21 is pivotally connected to the pivot block 83 by means of a yoke 84 and a vertical pivot pin 85 connecting the yoke 84 to the pivot block 83. When the rear frame 41 and associated parts are disconnected from the front frame section 40 and front gangs so as to provide a single action harrow, a bracket 90 is secured to the cross member 53 and acts against the yoke 84 so as to prevent the front gangs from tipping either forwardly or rearwardly, thus holding them in a stable position so as to permit the use of the front half of the harrow as a single action harrow.

While we have shown and described above the preferred structure in which the principles of the present invention have been incorporated, it is to be understood that our invention is not to be limited to the particular details shown and described above but that, in fact, widely different means may be employed in the practice of the broader aspects of our invention.

What we claim, therefore, and desire to secure by Letters Patent is:

1. In a tandem disk harrow, pairs of front and rear disk gangs, rigid front and rear frame sections, each including a pair of laterally spaced downwardly extending parts, means swingably connecting the inner end portions of said disk gangs to said downwardly extending parts for both up and down as well as fore and aft swinging, said front frame section comprising right and left laterally spaced inverted U-shaped members and a horizontally disposed U-shaped member having its forward portion fixed to said laterally spaced inverted U-shaped members, the forward downwardly extending portions of said inverted U-shaped members constituting hitch-receiving means and the rear downwardly extending portions constituting disk gang receiving means, said rear downwardly extending portions being curved outwardly adjacent the points of juncture between said laterally spaced members and said horizontally disposed U-shaped member and then inwardly so as to accommodate up and down swinging of said front gangs, the rear end portions of said horizontally disposed U-shaped member being apertured at fore and aft spaced points, and transversely disposed fastening means extending into said apertures for rigidly fixing the forward portion of said rear frame section to said rearwardly extending end portions of said front frame section.

2. In a tandem disk harrow having pairs of front and rear disk gangs, the improvement comprising frame means for the gangs which includes rigid front and rear frame sections, said front frame section comprising right and left laterally spaced inverted U-shaped members and a horizontally disposed U-shaped member having its forward portion fixed to said laterally spaced inverted U-shaped members, the forward downwardly extending portions of said inverted U-shaped members constituting hitch-receiving means and the rear downwardly extending portions constituting disk gang receiving means, said rear downwardly extending portions being curved outwardly adjacent the points of juncture between said laterally spaced members and said horizontally disposed U-shaped member and then inwardly and downwardly, forming portions to which the inner ends of the front gangs are adapted to be connected, the rear end portions of said horizontally disposed U-shaped member being apertured at fore and aft spaced points, and transversely disposed fastening means extending into said apertures for rigidly fixing the forward portion of said rear frame section to said rearwardly extending end portions of said front frame section.

3. In a tandem disk harrow having pairs of front and rear disk gangs, the improvement comprising frame means for the gangs which includes rigid front and rear frame sections, said front frame section comprising right and left laterally spaced members, each including an upper generally horizontal portion and a rear downwardly extending portion, and a horizontally disposed U-shaped member having its forward portion fixed to said laterally spaced members adjacent the points of juncture between the upper generally horizontal portions and the respective downwardly extending portions, the latter portions constituting disk gang receiving means, said rear downwardly extending portions being curved outwardly adjacent the points of juncture between said laterally spaced members and said horizontally disposed U-shaped member and then inwardly so as to accommodate up and down swinging of said front gangs, the rear end portions of said horizontally disposed U-shaped member being apertured at fore and aft spaced points, and transversely disposed fastening means extending into said apertures for rigidly fixing the forward portion of said rear frame section to said rearwardly extending end portions of said front frame section.

4. In a tandem disk harrow having pairs of front and rear disk gangs, the improvement comprising frame means for the gangs which includes rigid front and rear frame sections, said front frame section comprising right and left laterally spaced inverted U-shaped members and a horizontally disposed U-shaped member having its forward portion fixed to said laterally spaced inverted U-shaped members, the forward downwardly extending portions of said inverted U-shaped members constituting hitch-receiving means and the rear downwardly extending portions constituting disk gang receiving means, said rear downwardly extending portions forming portions to which the inner ends of the front gangs are adapted to be connected, the rear end portions of said horizontally disposed U-shaped member being apertured at fore and aft spaced points, said rear frame section including, at the rear thereof, means for pivotally receiving the inner ends of the rear disk gangs and forwardly thereof, generally forwardly extending laterally spaced apart frame bars which are apertured at their forward ends at fore and aft spaced points corresponding to the fore and aft spaced apertures in the rear end portions of said horizontally disposed U-shaped member, and transversely disposed fastening means extending through said apertures for rigidly fixing the forward ends of said laterally spaced apart frame bars of the rear frame section to said rearwardly extending end portions of said front frame section.

CHARLES H. WHITE.
WILLIAM P. OEHLER.

REFERENCES CITED

The following references are of record in the file of this patent:

UNITED STATES PATENTS

| Number | Name | Date |
|---|---|---|
| 1,729,087 | Robinson et al. | Sept. 24, 1929 |
| 2,338,698 | White | Jan. 11, 1944 |